United States Patent [19]

Blättler

[11] Patent Number: 4,921,162

[45] Date of Patent: May 1, 1990

[54] ELECTRICALLY CONTROLLED FLUID MIXING FIXTURE, ESPECIALLY FOR MIXING HOT AND COLD WATER

[75] Inventor: Ernst Blättler, Obfelden, Switzerland

[73] Assignee: KWC AG, Unterkulm, Switzerland

[21] Appl. No.: 342,342

[22] Filed: Apr. 24, 1989

Related U.S. Application Data

[63] Continuation of Ser. No. 246,270, Sep. 19, 1988, abandoned.

[30] Foreign Application Priority Data

Sep. 29, 1987 [CH] Switzerland .................. 03781/87

[51] Int. Cl.⁵ .................................. G05D 23/13
[52] U.S. Cl. ........................... 236/12.12; 137/88; 137/898; 236/12.15
[58] Field of Search .................. 236/12.12, 12.15; 137/88, 897, 898

[56] References Cited

U.S. PATENT DOCUMENTS 2,296,917  9/1942  Garrett et al. ............... 236/12.15
2,332,995  10/1943  Eaton ......................... 236/12.15 X
4,558,817  12/1985  Kiendl ........................ 236/12.12

FOREIGN PATENT DOCUMENTS 8520484  10/1985  Fed. Rep. of Germany .
81/01331  5/1981  PCT Int'l Appl. .
329423  4/1958  Switzerland .
451626  5/1968  Switzerland .

OTHER PUBLICATIONS

Japanese publication "Patent Abstracts of Japan", published Dec. 9, 1986 of Hiroaki Yonekubo.

Primary Examiner—William E. Tapolcai
Attorney, Agent, or Firm—Barnes & Thornburg

[57] ABSTRACT

In the fluid mixing fixture, a displacement body and a tubular shell, which coaxially encloses the displacement body, are arranged at an inflow element. A temperature measuring element, such as a nickel wire which is covered by a plastic jacket, is wound around the tubular shell at the region of an annular gap formed between the displacement body and the tubular shell. Hot water and cold water flow through inflow openings of the inflow element and into a recess or chamber thereof, at that location the hot water and cold water are admixed and then the admixed water flows through the annular gap to an outflow opening. Since the flow cross-sectional area of the annular gap is smaller than the inflow cross-sectional area of the inflow openings the velocity of the admixed water is increased. This promotes further admixing of the hot and cold water and enhances heat transfer to the tubular shell. A radial temperature gradient cannot develop in the annular gap, so that the temperature of the water can be measured extremely accurately. Measurement of the water temperature is accomplished very close to the location of intermixing of the hot and cold water, allowing exceedingly rapid detection of changes in the temperature of the admixed water. To attain the desired mixed water temperature valves are regulated by means of a control.

29 Claims, 2 Drawing Sheets

ELECTRICALLY CONTROLLED FLUID MIXING FIXTURE, ESPECIALLY FOR MIXING HOT AND COLD WATER

CROSS REFERENCE TO RELATED CASE

This application is a continuation of the commonly assigned, co-pending U.S. application Ser. No. 07/246,270, filed Sept. 19, 1988, entitled "ELECTRICALLY CONTROLLED FLUID MIXING FIXTURE, ESPECIALLY FOR MIXING HOT AND COLD WATER", and listing as the inventor ERNST BLÄTTLER, now abandoned.

BACKGROUND OF THE INVENTION

The present invention broadly relates to fluid mixing devices, especially hot and cold water mixing devices and, more specifically, pertains to a new and improved construction of an electrically controlled mixing fixture for fluids, especially hot and cold water, typically a plumbing fixture, also referred to in the art as a plumbing fitting.

Generally speaking, the electrically controlled mixing fixture for hot and cold fluids, especially hot and cold water, is of the type comprising an inflow or infeed element provided with inflow or inlet openings and an annular or gap-shaped flow channel for the fluids. There is also provided a temperature measuring element or means arranged at the region of the annular or gap-shaped flow channel.

In the German Petty Pat. No. G. 8520484.6, published Oct. 3, 1985, there is disclosed a measuring head for measuring the temperature of fluent or flowable fluids. In that arrangement, the fluids are conducted through two inflow openings in tangential direction into a ring-shaped flow channel. This ring-shaped flow channel is bounded in radial direction internally by a hollow cylinder of increased thermal conductivity and at the outside by a housing formed of a plastics material. At the end located remote from the two inflow openings the ring-shaped flow channel is connected by radial recesses with a bore provided in the hollow cylinder. This bore, in turn, flow communicates with an outflow or outlet opening. In order to swirl or place into turbulent motion the infed fluids and to ensure for a good heat transfer to the hollow cylinder impact plates are provided at the hollow cylinder which extend in the circumferential direction thereof and protrude into the ring-shaped flow channel. At the thick-wall hollow cylinder there are provided axial bore for receiving thermoelements which measure the temperature of the hollow cylinder. In the ring-shaped flow channel both of the fluids are thus agitated or swirled and admixed and due to fluid circulation around and within the hollow cylinder the latter reaches a temperature which approximately corresponds to the temperature of the admixed water which outflows through the outflow or outlet opening. With this heretofore known construction of measuring head it is not thought to be possible to achieve a very rapid and exact determination of the temperature of the mixed water owing to the sluggish or inertia-prone heating up of the hollow cylinder and the locally prevailing temperature differences.

SUMMARY OF THE INVENTION

Therefore with the foregoing in mind it is a primary object of the present invention to provide a new and improved construction of an electrically controlled mixing fixture for mixing hot and cold fluids, especially hot and cold water, which does not suffer from the aforementioned drawbacks and shortcomings of the prior art.

Another and more specific object of the present invention, is directed to a new and improved construction of an electrically controlled fluid mixing fixture which furnishes in an exceedingly brief period of time admixed water at a desired temperature and which can very precisely maintain and stabilize this temperature over a long period of time.

A further noteworthy object of the present invention is directed to a new and improved construction of an electrically controlled fluid mixing fixture of the character described which is relatively simple in construction and design, quite economical to manufacture, extremely reliable in operation and not readily subject to breakdown or malfunction.

Still a further appreciable object of the present invention aims at providing an improved construction of mixing fixture for fluids, especially hot and cold water, affording flow conditions for the hot and cold water which reliably result in the attainment of a desired temperature of the commingled or mixed water in an exceedingly brief amount of time and enabling quite accurate measurement of the mixed water temperature and retention of the desired temperature of the admixed water throughout longer time intervals.

Now in order to implement these and still further objects of the invention, which will become more readily apparent as the description proceeds, the electrically controlled mixing fixture of the present development, among other things, is manifested by the features that a premixing path or region is arranged upstream, with respect to the direction of flow of the fluids, typically the hot and cold water, of the annular or gap-shaped flow channel. A temperature measuring element or device, also referred to as temperature measuring means, for the mixed fluids is distributively arranged at or spaced along the annular or gap-shaped flow channel. A valve arrangement is disposed upstream of the inlet or inflow openings and serves to control the fluids as a function of the measured temperature of the admixed or mixed fluids.

In the premixing path or region the hot and cold fluids are partially admixed or commingled. The thus pre-mixed fluids are then superficially expanded or spread out, in other words, a large or expansive surface of the pre-mixed fluids is present in the annular or gap-shaped flow channel, and the temperature of the fluids is measured at distributed or spaced locations along the surface thereof. Due to this superficial fluid expansion or spreading the admixing of the fluids is further promoted and there is precluded the formation of an appreciable temperature gradient in a direction transverse to the surface of the fluids. As a result, a temperature measurement which is distributed over or undertaken throughout the surface of the fluids with the annular or gap-shaped flow channel furnishes exact temperature values since localized temperature differences at the surface of the fluids are advantageously taken into account. In particular, there is possible an exact temperature measurement of the initially admixed fluids before admixing or commingling thereof has been completed. This, in turn, affords rapid regulation or control of the supplied quantity of hot and cold fluids.

When the flow cross-section or cross-sectional area in the annular or gap-shaped constricted flow channel is smaller than the sum of the cross-sections or cross-sectional areas of the inflow or inlet openings, then there is beneficially accomplished acceleration of the pre-mixed fluids. This additionally enhances the admixing of the hot and cold fluids and renders possible accomplishment of a more rapid temperature measurement.

According to a desirable embodiment of the invention, the annular flow channel is bounded or delimited in radial direction by a displacement element and a shell or jacket element. The displacement element can be constituted by a displacement body or body member and the temperature measuring element or means can be distributively arranged at or spaced along the displacement body and/or the shell or jacket element. This affords an exceedingly space-saving construction of the fluid mixing fixture.

According to a further aspect of the invention, the annular or ring-shaped or gap-like flow channel is inwardly bounded in radial direction by a tubular element. This tubular element encases or encircles the premixing path and is in flow communication with the inflow or inlet openings. Moreover, this annular or ring-shaped or gap-like flow channel is externally bounded at least at the end region of the tubular element remote from the inflow or inlet openings by a substantially hood-shaped shell or jacket element. The temperature measuring element or means is arranged at this substantially hood-shaped shell or jacket element. Such construction affords an exceedingly good admixing or commingling of the fluids. Due to the deflection of the premixed fluids at the end of the tubular element there is additionally enhanced fluid admixing, which, in turn, likewise increases the accuracy of the intermixing operation.

The temperature measuring element or means can comprise thermoelements which are distributively arranged at or spaced along the shell or jacket element or at the displacement body. In this manner, there can be determined the temperature of the premixed fluids in the annular or ring-shaped or gap-like flow channel by accomplishing the temperature detection over a predeterminate region of such annular or ring-shaped or gap-like flow channel which, in turn, affords a reliable and extremely accurate control of the mixed fluid temperature, here typically the temperature of the mixed hot and cold water.

Particular advantages are realized with an electrically controlled fluid mixing fixture which is designed such that the temperature measuring element or means comprises a barretter or PTC-resistor which is wound about the shell or jacket element or is contactingly or snugly arranged at a wall of the displacement body internally thereof. Such fluid mixing fixture is exceedingly simple to fabricate and the temperature measuring element or means spans a large region or area of the shell or jacket element or the displacement body, as the case may be, which likewise favors temperature detection in an exceedingly accurate fashion.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have been generally used the same reference characters to denote the same or analogous components and wherein.

DETAILED DESCRIPTION OF THE PREFERRED EMBODIMENTS

Figure 1:
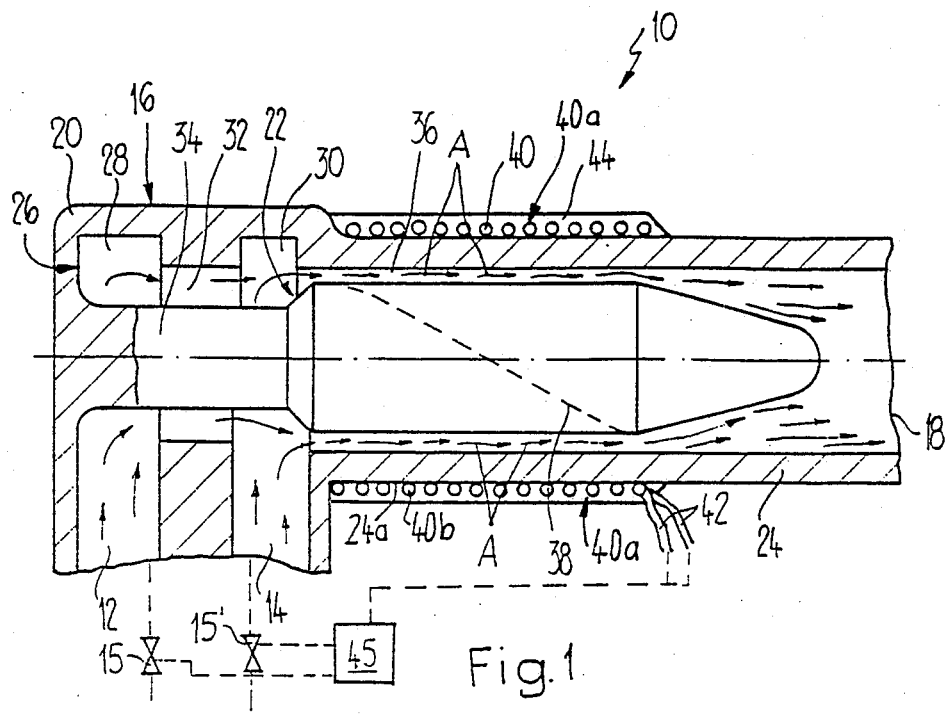
FIG. 1 is a schematic longitudinal sectional view of a portion of a first exemplary embodiment of a fluid mixing fixture wherein the temperature measuring element or means is arranged at the shell or jacket element.

Describing now the drawings, it is to be understood that to simplify the showing thereof, only enough of the structure of the electrically controlled fluid mixing fixture or fluid mixing device or the like of the present invention has been illustrated therein as is needed to enable one skilled in the art to readily understand the underlying principles and concepts of this invention. Turning now specifically to FIG. 1 of the drawings, there will be recognized a first exemplary embodiment of fluid mixing fixture 10 wherein two fluids to be admixed, here assumed to be cold and hot water, individually flow into a sensor body or body member 16 through valves 15 and 15' which are arranged upstream, with respect to a predetermined direction of fluid flow, of inflow or inlet openings 12 and 14 of such sensor body or body member 16. The commingled or admixed hot and cold water again effluxes from the sensor body or body member 16 through an outlet or outflow opening 18.

This sensor body 16 comprises an inflow or infeed element 20, a displacement body or body member 22 and a thin-wall element, here a shell or jacket 24, also referred to as a tubular shell or jacket. A recess or chamber 26 is provided in the inflow or infeed element 20 and extends in axial direction of the tubular shell or jacket 24. Both of the inflow or inlet openings 12 and 14 open in radially and substantially mutually parallel directions into the recess or chamber 26. Within the recess or chamber 26 each inflow or inlet opening 12 and 14 has operatively associated therewith an annular or ring-shaped widened or enlarged portion or enlargement region 28 and 30, respectively, and these ring-shaped or annular widened portions 28 and 30 flow communicate with one another by means of a central opening or passage 32.

The displacement body or body member 22, which is coaxially arranged with respect to the tubular shell or jacket 24, is attached at the inflow element 20 by means of a displacement arm or arm member 34 of the displacement body 22. This displacement arm or arm member 34 piercingly extends through the recess or chamber 26. Between the tubular shell or jacket 24 and the displacement body 22 there is formed an annular or ring-shaped flow channel or gap 36. The flow cross-section or cross-sectional area of this annular or ring-shaped flow channel or gap 36 is smaller than the sum of the cross-sectional areas or cross-sections of both of the inflow or inlet openings 12 and 14. The cross-section or cross-sectional area of the displacement body 22 is essentially constant at the region of the tubular shell or jacket 24 throughout a length which corresponds to approximately twice the internal diameter of the tubular shell 24 and then decreases in the downstream direction of the fluid flow so that the end or end region 22a of the displacement body 22 is streamlined. The broken or chain line 38 depicted in FIG. 1 designates fluid admixture facilitating means, here shown as ribs or grooves which can be arranged at the outer surface of the displacement body or body member 24 or at the inner surface of the tubular shell 24 and impart to the water which flows through the annular gap 36 a rotational motion in order to improve the mixing or commingling of the hot and cold water.

At the region of the displacement body 22 there is wound in a spool-like or coiled formation a temperature measuring element or means 40a, here shown in the form of a thin nickel wire 40. The free ends of this thin nickel wire 40 have been conveniently designated by reference character 42. This nickel wire 40 is encased at the region of the wound or coiled windings or coils 40b thereof by a plastic jacket or enclosure member 44. On the one hand, this plastic jacket or enclosure member 44 presses the nickel wire 40 against the outer surface 24a of the tubular shell 24 and, on the other hand, thermally insulates the nickel wire 40 with respect to the ambient or environment. The arrows A conveniently designate the direction of flow of the water.

Reference numeral 45 designates a suitable control or control device with which there are connected the ends 42 of the nickel wire 40 and the conventional electrical drive for the operation of the valves or valve means 15 and 15'. Furthermore, this control 45 is operatively associated with any suitable and therefore not particularly illustrated input element for preselecting the mixed water temperature, as is well known in this technology.

Having now had the benefit of the foregoing discussion of the exemplary embodiment of fluid mixing fixture as depicted in FIG. 1, there will now be considered the operation thereof including the manner in which the same functions to detect the temperature of the mixed water and which is as follows:

When the valves 15 and 15' are open, then cold water flows, for instance, through the inflow opening 12 and hot water flows through the inflow opening 14 into the respective widened or enlarged portions 28 and 30 of the recess or chamber 26. The hot and cold water is deflected in this recess or chamber 26 in axial direction and already begins to admix in the widened or enlarged portion 30. Thereafter, the premixed water flows through the annular or ring-shaped or gap-like flow channel 36. Since the flow cross-sectional area of this annular or ring-shaped flow channel 36 is smaller than the total cross-sectional area of the inflow or inlet openings 12 and 14, at the region of such annular or ring-shaped flow channel 36, the water possesses an increased velocity which, in turn, improves the heat transfer to the tubular shell or jacket 24 and thus to the nickel wire 40. By designing the tubular shell or jacket 24 as a thin-wall structure such likewise increases the rate of heat transfer from the water to the nickel wire 40. The narrow annular or ring-shaped or gap-like flow channel 36 enhances the admixing or commingling of the hot and cold water and the admixed water which flows therethrough does not possess any or, at most, only a slight temperature gradient in radial direction. This appreciably improves the accuracy of the temperature measurement. The aforedescribed helical grooves or ribs 38 additionally promote or enhance the admixing of the hot and cold water.

The temperature measuring element or means 40a, here the nickel wire 40, is a so-called barretter or PTC-resistor which changes its resistance as a function of temperature. If, for instance, the nickel wire 40 possesses a resistance of 1000 Ohms at 25° C., then at a temperature of 35° C. this resistance increases to 1050 Ohms and at 50° C. to 1120 Ohms. A simple resistance measurement thus allows measuring the temperature of the mixed or admixed water. Since the water is admixed or commingled prior to entry into the annular or ring-shaped flow channel or gap 36 and the temperature is measured over a large surface, the described arrangement allows the provision of the temperature measuring element or means 40a, here the nickel wire 40, near to that region where there is initiate the admixing of the hot and cold water. The temperature measurement therefore is accomplished exceedingly rapidly and nonetheless in an extremely accurate fashion.

The control or control device 45 evaluates the measured temperature and, governed by the preselected mixed water temperature, appropriately controls the valves 15 and 15'.

Figure 2:
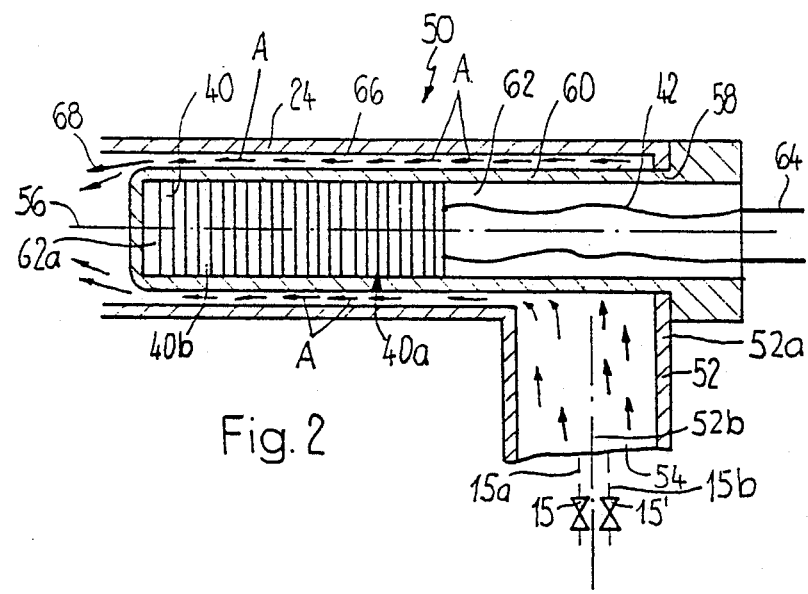
FIG. 2 schematically illustrates in longitudinal sectional view a portion of a fluid mixing fixture wherein the temperature measuring element or means is provided in a displacement body thereof and which fluid mixing fixture is constructed in accordance with a second exemplary embodiment of the invention.

At this point there will now be described the second exemplary embodiment of fluid mixing fixture 50 as depicted in FIG. 2, wherein it will be recognized that the outlets 15a and 15b of the valves 15 and 15', respectively, open into a first tubular or tube-like portion 52 provided with the inflow or inlet openings 54. At the end 52a of this tubular or tube-like portion 52 which is remote from the inflow or inlet openings 54, there is arranged a further tubular portion in the form of the tubular shell or jacket 24 such that the respective lengthwise axis 52b and 56 of each of the first tubular portion 52 and the tubular shell or jacket 24 intersect approximately at right angles with respect to one another. In the arrangement shown the first tubular portion 52 is formed as part of or integral with the tubular shell or jacket 24. Moreover, it will be observed that the first tubular portion 52 is provided with an opening or throughpass hole 58, located substantially coaxially with respect to the lengthwise axis 56, of the tubular shell or jacket 24. Through this opening or throughpassage 58 there is inserted a displacement body or body member 60.

The length of the displacement body or body member 60 which extends within the tubular shell or jacket 24 corresponds approximately to three times the internal diameter of the tubular shell or jacket 24.

This displacement body 60 is designed as a thin-wall structure, so that there is formed a hollow space or chamber 62 within which there is arranged the spool-like wound or coiled windings or coils 40b of the temperature measuring element or means 40a, again here a nickel wire 40. This nickel wire 40 is wound within the hollow space or chamber 62, starting at the region of the end 62a located downstream with respect to the direction of flow A of the hot and cold water, such that it extends approximately over one-half the length of this hollow space or chamber 62. The free ends 42 of the nickel wire 40 lead to connection pins or terminals 64 which are connected with the control or control device, not shown in FIG. 2 but analogous to the control or control device 45 depicted in FIG. 1. Just as was previously described, this control or control device 45 likewise operates or controls the valves 15 and 15' which are arranged upstream of the first tubular portion 52.

With this design of fluid mixing fixture the hot and cold water is premixed in the first tubular portion 52, initially flows in a direction transverse and towards the displacement body or body member 60, at that location is deflected and then flows through the annular or ring-shaped flow channel or gap 66 to the outflow or outlet opening 68. This annular or ring-shaped flow channel or gap 66 is formed between the tubular shell or jacket 24 and the displacement body 60. The flow cross-sectional area of the annular or ring-shaped flow channel or gap 66 is smaller than the inflow cross-sectional area of the first tubular portion 52 by the amount of the cross-sectional area of the displacement body 60. Due to the deflection of the hot and cold water as well as the increased flow velocity in the annular or ring-shaped flow channel or gap 66 there is beneficially accomplished an additional admixing of the hot and cold water and a good transfer of the heat of the admixed water to the temperature sensor constituted by the temperature measuring means or device 40a comprising the nickel wire 40. It will be recalled that the function of this nickel wire 40 as a temperature sensor or temperature measuring expedient and its coaction with the control or control device 45 has been previously explained so that no further discussion is believed here necessary.

Regarding the remaining two embodiments depicted in FIGS. 3 and 4, it is here again observed that the same or analogous components or elements have been generally conveniently designated with the same reference characters as used for the first exemplary embodiment described with reference to FIG. 1.

Figure 3:
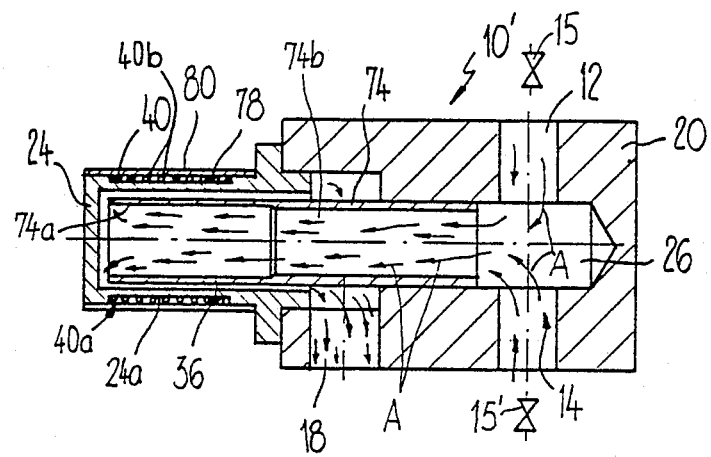
FIG. 3 is a longitudinal sectional view through a portion of a third exemplary embodiment of fluid mixing fixture wherein the displacement body is formed by a tube or tubular element which encloses a premixing path or region.

Turning attention now to FIG. 3, the therein depicted third exemplary embodiment of fluid mixing fixture 10' has the inflow element 20 provided therein with two mutually confronting inflow or inlet openings 12 and 14 which terminate in a recess or chamber 26 extending approximately at right angles or perpendicular to the direction of extent of the inflow or inlet openings 12 and 14. Valves 15 and 15' are arranged upstream of the associated inflow or inlet openings 12 and 14 with respect to the direction of flow A of the hot and cold water. Arranged within the recess or chamber 26 is a tubular element or tube 74 which protrudes beyond the inflow element 20, as shown.

The end region 74a of the tubular element 74 and which protrudes beyond the inflow element 20 and is located remote from the inflow or inlet openings 12 and 14, is enclosed by a substantially coaxially arranged hood-shaped tubular shell or jacket or shell element 24 which is in flow communication with the outlet or outflow opening 18. At this substantially hood-shaped tubular shell or jacket 24 there is provided at its outer surface 24a a substantially cylindrical-shaped recess or depression 78 in which there is wound or coiled the windings or coils 40b of the temperature measuring element or means 40a, here again, for instance, the nickel wire 40. This nickel wire 40 is covered by a metallic covering or enclosure 80, for instance formed of sheet metal or metal plating, and likewise is connected with the control or control device 45, not shown in FIG. 3 to simplify the illustration but depicted and explained previously with reference to the embodiment of FIG. 1.

Hot and cold water is delivered through both of the inflow or inlet openings 12 and 14 to the recess or chamber 26 where there occurs an initial admixing of such hot and cold water. The mixed water then flows through the premixing path or region 74b bounded by the tubular element 74 towards the substantially hood-shaped tubular shell or jacket 24, at that location is deflected or turned through an angle of about 180° and then continues to flow in generally counter-current through the annular or ring-shaped flow channel or gap 36 to the outflow or outlet opening 18. It will be recognized that this annular or ring-shaped flow channel or gap 36 is bounded by the tubular element 74 and the substantially hood-shaped tubular shell or jacket 24. Due to the deflection of the water through such angle of approximately 180° there is accomplished a particularly good admixing of the hot and cold water. Once again the control or regulation of the valves 15 and 15' is accomplished in analogous fashion as has been heretofore described with respect to the embodiment of FIG. 1.

Figure 4:
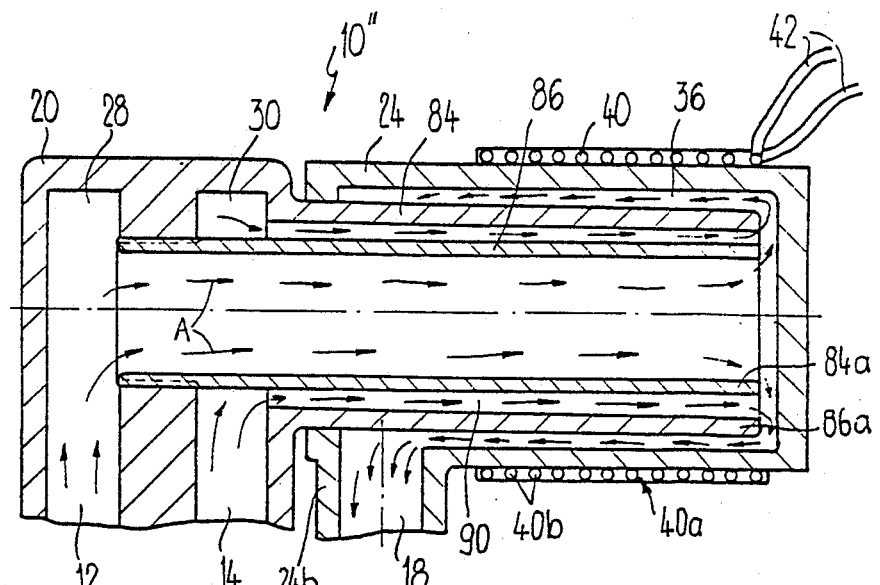
FIG. 4 illustrates a fourth exemplary embodiment of fluid mixing fixture, again depicting in schematic longitudinal sectional view a portion of such fluid mixing fixture having a pre-heating path or region for the cold fluid, here assumed to be cold water.

Continuing, and finally considering the fourth exemplary embodiment of fluid mixing fixture 10'' as depicted in FIG. 4, it is to be understood that such constitutes a further development of the fluid mixing fixture 10 of the first exemplary embodiment of FIG. 1. Therefore, as noted previously, there have been generally used the same reference characters in FIG. 4 to denote the same or analogous components as heretofore described with respect to the embodiment of FIG. 1. Consequently, as to such analogous components or elements they will only again be considered to the extent needed for understanding the function of this modified construction of fluid mixing fixture 10''.

Again it will be recognized that both of the inflow or inlet openings 12 and 14 within the inflow element 20, which are in flow communication with the widened or enlarged portions or enlargement regions 28 and 30, are here no longer in flow communication with one another as was the case for the arrangement of FIG. 1. Within the tubular or tube portion 84 which is in flow communication with the widened or enlarged portion 30 there is coaxially arranged a further good thermally conducting tube or tubular element 86. This tube or tubular element 86 flow connects the widened or enlarged portion 28 with the end or end region 84a of the tubular portion 84 located downstream with respect to the direction of flow A of the water, here the hot water, influxing through the inflow opening 12. The tubular portion 84 and the further tubular element 86 are covered by a substantially hood-shaped shell or jacket element 24 at a location downstream of the inflow element 20, so that the annular or ring-shaped flow channel or gap 36 is disposed between the tubular shell or jacket 24 and the tubular portion 84. The outflow or outlet opening 18 is arranged at the end region 24b of the tubular shell or jacket 24 which confronts the inflow element 20. Once again, a spool-like or coiled temperature measuring element or means 40a, likewise constituted for instance by a nickel wire 40, and composed of the wound or coiled windings or coils 40b is wound about the tubular shell or jacket 24.

In this fluid mixing fixture 10'' the hot water which influxes through the inflow opening 12 is deflected by the widened or enlarged portion 28 into the further tube or tubular element 86 and the cold water which influxes through the inflow or inlet opening 14 flows, while being pre-heated owing to the thermal action of the tubular element 86 which is heated by the hot water, coaxially between this tubular element 86 and the tubular or tube portion 84 until reaching the substantially aligned ends 84a and 86a of both of these tubular or tube structures 84 and 86. At this location, the water which has flowed through the annular or ring-shaped flow channel 90 formed between the tubular portion 84 and the tubular element 86 outflows in a ring-shaped or annular configuration or flow pattern and owing to the hot water which continues to flow through the tubular element 86, and while being admixed with such hot water, is forced radially outwardly. Due to the arrangement of the tubular shell or jacket 24 such admixed water is then deflected or turned through an angle of about 180°. In the annular or ring-shaped flow channel or gap 36 there occurs an additional admixing and measurement of the temperature of the admixed water analogous to what has been heretofore described. This temperature is likewise detected by means of the nickel wire 40 very close to the mixing or admixing point or location of the commingled hot and cold water.

By way of completeness, it is mentioned that also in the annular or ring-shaped flow channels or gaps 36 of the respective fluid mixing fixtures 50, 10' and 10" depicted in FIGS. 2, 3 and 4, there also can be arranged helically extending grooves or ribs 38 defining the admixture or admixing facilitating means, as such has been previously described with reference to the embodiment of FIG. 1. Such grooves or ribs 38 provide for an additional beneficial admixing of the water.

It is also to be understood that the temperature measuring element or means need not be constituted solely by the exemplary described barretter or PTC-resistor formed of nickel wire 40 and wound in a spool-like or coiled configuration. Thus, instead of the nickel wire 40 a plurality of thermoelements can be distributively arranged at or spaced along the tubular shell or jacket and/or the displacement body 22 or 60 internally thereof, and by performing a summing operation or by forming a mean or average value of the thermopotential, there can be indicated the temperature of the mixed water.

All of the various embodiments of fluid mixing fixtures 10, 50, 10' and 10", as described and explained with reference to FIGS. 1, 2, 3 and 4, respectively, have in common that the flow cross-sectional area in the annular or ring-shaped or gap-like flow channel 36 is smaller than the total cross-sectional area of the inflow openings 12, 14 and 54, and that the temperature measuring element or means, whether such be a barretter or PTC-resistor, thermoelement or a different temperature sensor or probe, is arranged in the region of this annular or ring-shaped or gap-like flow channel 36.

In the various embodiments of fluid mixing fixtures 10, 10', 10" and 50 as heretofore described, the flowable or fluent media, here water, is superficially expanded or spread out in the annular or ring-shaped or gap-like flow channel as heretofore described and the temperature is measured at the enlarged or more expansive surface. For the improved and, above all, more rapid transfer of the thermal energy of the water to the temperature measuring element or means, the tubular shell or jacket 24 and/or the displacement body 22 or 60, as the case may be, is constructed as a thin-wall structure and formed of any suitable material having good thermal conductivity.

While there are shown and described present preferred embodiments of the invention, it is to be distinctly understood that the invention is not limited thereto, but may be otherwise variously embodied and practiced within the scope of the following claims.
ACCORDINGLY,

What I claim is:

1. An electrically controlled fluid mixing fixture for hot and cold fluids, especially hot and cold water, comprising:
   means providing respective inflow openings for a hot fluid and a cold fluid;
   means defining a substantially annular flow channel for the hot and cold fluids and flow communicating with said inflow openings;
   temperature measuring means arranged at the region of said substantially annular flow channel;
   means defining a premixing path for admixing the hot and cold fluids;
   said premixing path being arranged upstream of said substantially annular flow channel with respect to a predetermined direction of flow of the hot and cold fluids;
   said temperature measuring means serving to measure the temperature of the admixed hot and cold fluids and being distributively arranged at the substantially annular flow channel;
   valve means arranged upstream of said inflow openings with respect to said predetermined direction of flow of the hot and cold fluids; and
   said valve means serving for controlling the hot and cold fluids as a function of the measured temperature of the admixed hot and cold fluids.

2. The fluid mixing fixture as defined in claim 1, wherein:
   said annular flow channel defines a substantially ring-shaped gap structure.

3. The fluid mixing fixture as defined in claim 2, wherein:
   said substantially annular flow channel possesses a predetermined flow cross-sectional area;
   each of said inflow openings possessing a predetermined flow cross-sectional area; and
   the flow cross-sectional area of the substantially annular flow channel being smaller than the sum of the flow cross-sectional areas of the inflow openings.

4. The fluid mixing fixture as defined in claim 3, wherein:
   said means defining said substantially annular flow channel comprises:
   a tubular shell
   a displacement element; and
   said substantially annular flow channel being bounded in radial direction by said tubular shell and said displacement element.

5. The fluid mixing fixture as defined in claim 4, wherein:
   said displacement element comprises a displacement body; and
   said temperature measuring means being distributively arranged at said displacement body.

6. The fluid mixing fixture as defined in claim 4, wherein:
   said displacement element comprises a displacement body; and
   said temperature measuring means being distributively arranged at said tubular shell.

7. The fluid mixing fixture as defined in claim 1, wherein:
said substantially annular flow channel possesses a predetermined cross-sectional area;
each of said inflow openings possessing a predetermined cross-sectional area; and
the cross-sectional area of the substantially annular flow channel being smaller than the sum of the cross-sectional areas of the inflow openings.

8. The fluid mixing fixture as defined in claim 2, wherein:
said means defining said substantially annular flow channel comprises:
a tubular shell;
a displacement element, and
said substantially annular flow channel being bounded in radial direction by said tubular shell and said displacement element.

9. The fluid mixing fixture as defined in claim 2, wherein:
said means defining said substantially annular flow channel comprises:
a tubular element which in radial direction bounds an inner side of said substantially annular flow channel;
said tubular element constituting said means defining said premixing path and enclosing said premixing path and being in flow communication with said inflow openings;
a substantially hood-shaped tubular shell for bounding the substantially annular flow channel at an outer side thereof at an end region of the tubular element remote from the inflow openings; and
said temperature measuring means being arranged at said tubular shell.

10. The fluid mixing fixture as defined in claim 1, wherein:
said means defining said substantially annular flow channel comprises:
a tubular element which in radial direction bounds an inner side of said substantially annular flow channel;
said tubular element constituting said means enclosing said premixing path and enclosing said premixing path and being in flow communication with said inflow openings;
a substantially hood-shaped tubular shell for bounding the substantially annular flow channel at an outer portion thereof at an end region of the tubular element remote from the inflow openings; and
said temperature measuring means being arranged at said tubular shell.

11. The fluid mixing fixture as defined in claim 4, wherein:
said temperature measuring means comprise thermo-element means distributively arranged at the circumference of the tubular shell.

12. The fluid mixing fixture as defined in claim 4, wherein:
said temperature measuring means comprise thermo-element means distributively arranged at the circumference of the displacement element.

13. The fluid mixing fixture as defined in claim 4, wherein:
said temperature measuring means comprise a barretter which is arranged in wound configuration about the tubular shell.

14. The fluid mixing fixture as defined in claim 13, wherein:
said barretter comprises a nickel wire which is wound about said tubular shell.

15. The fluid mixing fixture as defined in claim 4, wherein:
said temperature measuring means comprises a barretter which is arranged at a wall of the displacement element.

16. The fluid mixing fixture as defined in claim 15, wherein:
said barretter comprises a nickel wire.

17. The fluid mixing fixture as defined in claim 4, further including:
fluid admixture facilitating means arranged at the tubular shell; and
said fluid admixture facilitating means extending in a substantially helical configuration.

18. The fluid mixing fixture as defined in claim 17, wherein:
said fluid admixture facilitating means comprise helically extending rib means.

19. The fluid mixing fixture as defined in claim 17, wherein:
said fluid admixture facilitating means comprise helically extending groove means.

20. The fluid mixing fixture as defined in claim 4, further including:
fluid admixture facilitating means for improving admixing of the fluids and arranged at said displacement element; and
said fluid admixture facilitating means extend in a substantially helical configuration.

21. The fluid mixing fixture as defined in claim 20, wherein:
said fluid admixture facilitating means comprise rib means extending in a substantially helical configuration at the displacement element.

22. The fluid mixing fixture as defined in claim 20, wherein:
said fluid admixture facilitating means comprise groove means extending in a helical configuration at the displacement element.

23. The fluid mixing fixture as defined in claim 4, wherein:
said tubular shell comprises a thin-wall structure at least at the region of the temperature measuring means.

24. The fluid mixing fixture as defined in claim 23, wherein:
said thin-wall structure is formed of a material having good thermal conductivity.

25. The fluid mixing fixture as defined in claim 4, wherein:
said displacement element is formed of a thin-wall material at least at the region of the temperature measuring means.

26. The fluid mixing fixture as defined in claim 25, wherein:
said thin-wall structure is formed of a good thermally conducting material.

27. The fluid mixing fixture as defined in claim 1, further including:
means defining a pre-heating path for the cold fluid arranged upstream of said pre-mixing path.

28. The fluid mixing fixture as defined in claim 27, wherein:
  said pre-heating path is defined by a thermally conductive tube means which coaxially separates from flow communication with one another the inflow openings; and
  said substantially annular flow channel is arranged at the neighborhood of an end region of said thermally conductive tube means substantially coaxially with respect to said pre-heating path.

29. An electrically controlled fluid mixing fixture for hot and cold fluids, espcially hot and cold water, comprising:
  inflow opening means providing respective inflow openings for a hot fluid and a cold fluid;
  means defining an annular flow channel for throughflow of hot and cold fluids which are admixed in the flow channel and flow communicating with said inflow openings;
  temperature measuring means arranged at the region of said flow channel;
  premixing means for premixing the hot and cold fluids;
  said premixing means being arranged upstream of said flow channel with respect to a predetermined direction of flow of the hot and cold fluids;
  said temperature measuring means serving to measure the temperature of the admixed hot and cold fluids and being arranged along the annular flow channel;
  valve means arranged upstream of said inflow openings with respect to said predetermined direction of flow of the hot and cold fluids; and
  said valve means serving for controlling the hot and cold fluids as a function of the measured temperature of the admixed hot and cold fluids.

* * * * *